US010228110B1

(12) United States Patent
Evans

(10) Patent No.: US 10,228,110 B1
(45) Date of Patent: Mar. 12, 2019

(54) HANDHELD ILLUNATING DEVICE WITH ORB-SHAPED LENS FOR ENHANCING FORWARD AND LATERAL VISIBILITY

(71) Applicant: Robert Evans, Las Vegas, NV (US)

(72) Inventor: Robert Evans, Las Vegas, NV (US)

( * ) Notice: Subject to any disclaimer, the term of this patent is extended or adjusted under 35 U.S.C. 154(b) by 0 days.

(21) Appl. No.: 15/949,042

(22) Filed: Apr. 9, 2018

(51) Int. Cl.

| | |
|---|---|
| ***B60Q 1/26*** | (2006.01) |
| ***F21V 3/02*** | (2006.01) |
| ***F21V 23/02*** | (2006.01) |
| ***F21V 15/01*** | (2006.01) |
| ***F21V 23/04*** | (2006.01) |
| ***F21V 3/04*** | (2018.01) |
| ***F21V 14/02*** | (2006.01) |
| ***F21V 7/05*** | (2006.01) |
| *F21Y 115/10* | (2016.01) |

(52) U.S. Cl.
CPC ................ *F21V 3/02* (2013.01); *F21V 3/049* (2013.01); *F21V 7/05* (2013.01); *F21V 14/025* (2013.01); *F21V 15/01* (2013.01); *F21V 23/02* (2013.01); *F21V 23/0414* (2013.01); *F21Y 2115/10* (2016.08)

(58) Field of Classification Search
CPC .......... F21V 3/02; F21V 3/049; F21V 14/025; F21V 23/0414
See application file for complete search history.

(56) References Cited

U.S. PATENT DOCUMENTS

| | | | | |
|---|---|---|---|---|
| 6,328,456 B1 * | 12/2001 | Mize | H01L 33/54 | 257/E33.059 |
| 2006/0039139 A1 * | 2/2006 | Maglica | F21L 4/027 | 362/202 |
| 2011/0234078 A1 * | 9/2011 | Choi | F21K 9/00 | 313/46 |
| 2011/0248622 A1 * | 10/2011 | Wang | F21K 9/232 | 313/483 |
| 2013/0194802 A1 * | 8/2013 | Kim | F21V 5/04 | 362/245 |
| 2016/0215954 A1 * | 7/2016 | Green | G02B 5/0242 | |

* cited by examiner

*Primary Examiner* — Evan Dzierzynski
(74) *Attorney, Agent, or Firm* — Steven Rinehart

(57) ABSTRACT

An handheld illuminating device with orb-shaped lens for enhancing forward and lateral visibility including a flashlight having at least one light source that emits light rays through an orb-shaped lens. The orb-shaped lens is semi-spherical and adapted to disperse the light rays through a substantially 270° arc of uniform light for illuminating more than one area around the user, diffusing the light rays to soften the illumination from the light source, and eliminates shadows that are inherent in flat or curvilinear lenses. A reflector reflects light rays from the light source to the orb-shaped lens. A power supply powers the light source. A switch regulates power and intensity of the light source. A transparent cover protects the orb-shaped lens from physical damage.

4 Claims, 2 Drawing Sheets

HANDHELD ILLUNATING DEVICE WITH ORB-SHAPED LENS FOR ENHANCING FORWARD AND LATERAL VISIBILITY

FIELD OF THE INVENTION

This invention relates to a handheld illumination device with a spherical lens for enhancing forward and lateral visibility, and more particularly relates to a flashlight having at least one light source that transmits light rays through an orb-shaped lens that is defined by a globe shape and a uniform thickness that disperses the light rays through a substantially 270° arc of uniform light for purposes of illuminating two or more areas simultaneously; diffuses the light rays to soften the illumination from the light source for reducing glare; and eliminates shadows that are inherent in flat or curvilinear lenses for enhancing visibility in front of, to the sides of the user.

BACKGROUND

Description of the Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a flashlight is a portable hand-held electric light that includes a two-cell battery for power, an incandescent lamp to emit light, and a simple single-pole switch to connect and disconnect the battery to the lamp. Different types of flashlights may use other numbers of battery cells in order to provide a voltage suitable for various particular conditions.

Generally, the user of a flashlight, while walking along a darkened path, or down a staircase, cannot illuminate the path immediately in front of the feet to avoid obstacles to the next step while simultaneously lighting the path further in front of, and around the feet to illuminate obstructions which could be avoided if anticipated sufficiently in advance. Further, a shadow is a dark area where light from a light source is blocked by an opaque object. It occupies all of the three-dimensional volume behind an object with light in front of it. Illuminating the area around the feet and through shadows and obstacles is difficult with a standard flashlight or lantern that illuminates a narrow region in front of the user.

SUMMARY

From the foregoing discussion, it should be apparent that a need exists for an electric illuminating device with orb-shaped lens that emits light rays from at least one light source through an orb-shaped lens that casts the light rays in a 270° arc of uniform light. Beneficially, such an electric illuminating device would provide at least one light source that transmits light rays through an orb-shaped lens defined by a globe shape and a uniform thickness. The orb-shaped lens is uniquely configured to cast the light rays in a substantially 270° arc of uniform light. The orb-shaped lens provides additional advantages, such as illuminating two or more areas simultaneously, diffusing the light rays to soften the illumination from the light source, and eliminating shadows that are inherent in flat or curvilinear lenses. This works to enhance visibility in front of, and to the sides of the user.

The present invention has been developed in response to the present state of the art, and in particular, in response to the problems and needs in the art that have not yet been fully solved by currently available electric lights and flashlights. Accordingly, the present invention has been developed to provide an electric illuminating apparatus with orb-shaped lens, the apparatus comprising: a case defined by a proximal end, a distal end, and a sidewall forming an interior cavity; a power supply; a switch operatively connected to the power supply; at least one light source disposed at the distal end of the case, the light source being operatively connected to the power supply and the switch, the light source emitting light rays to affect illumination; whereby the power supply powers illumination by the light source; whereby the switch selectively regulates illumination by the light source; a reflector disposed in the interior cavity of the case, and adjacent to the light source, the reflector being sized and dimensioned to at least partially reflect the light rays from the light source towards the distal end of the case; an orb-shaped lens disposed at the distal end of the case, the orb-shaped lens being defined by a generally globe shape and a uniform thickness, the orb-shaped lens enabling passage of the light rays emitted by the light source and reflected by the reflector; whereby the orb-shaped lens disperses the light rays in a 270° arc of uniform light; whereby the orb-shaped lens softens illumination from the light source; and whereby the orb-shaped lens reduces shadows created by the illumination.

The apparatus may further comprise a transparent cover, the transparent cover substantially covering the orb-shaped lens.

The switch may be defined by a textured surface.

The power supply may comprise at least one or more of: a D/C battery, a rechargeable battery, a solar panel, and an external power supply.

The case may comprise a generally elongated cylindrical shape.

The distal end of the case may form an opening. In some embodiments, the reflector may comprise a disc-shaped panel of metal. The disc-shaped panel may be planar.

The at least one light source may comprise an incandescent light bulb or a light emitting diode.

In various embodiments, the at least one light source may comprise multiple light sources. The device may comprise a flashlight. In some embodiments, the apparatus may comprise a second switch adapted to change position of the light source relative to the orb-shaped lens.

An electric illuminating apparatus with orb-shaped lens is also provided, the device consisting of: a generally elongated cylindrical case defined by a proximal end, a distal end, and a sidewall forming an interior cavity, the distal end of the case forming an opening; a power supply, the power supply comprising at least one of the following: a D/C battery, a rechargeable battery, a solar panel, and an external power supply; a switch operatively connected to the power supply, the switch being defined by a textured surface; at least one light source disposed at the distal end of the case, the light source being operatively connected to the power supply and the switch, the light source emitting light rays to affect illumination, the at least one light source comprising an incandescent light bulb or a light emitting diode; whereby the power supply powers illumination by the light source; whereby the switch selectively regulates illumination by the light source and the switch is slidable to change position of the light source relative to the orb-shaped lens; a reflector disposed in the interior cavity of the case, and adjacent to the light source, the reflector being sized and dimensioned to at least partially reflect the light rays from the light source towards the distal end of the case, the reflector comprising a disc-shaped panel of metal; an orb-shaped lens disposed at the distal end of the case, the orb-shaped lens being defined by a generally globe shape and a uniform thickness, the orb-shaped lens enabling passage of the light rays emitted by the light source and reflected by the reflector; whereby the orb-shaped lens disperses the light rays in a 270° arc of uniform light; whereby the orb-shaped lens softens illumination from the light source; and whereby the orb-shaped lens reduces shadows created by the illumination.

The at least one light source may comprise multiple light sources. The device may further comprise a flashlight.

The light source may comprise an LED.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
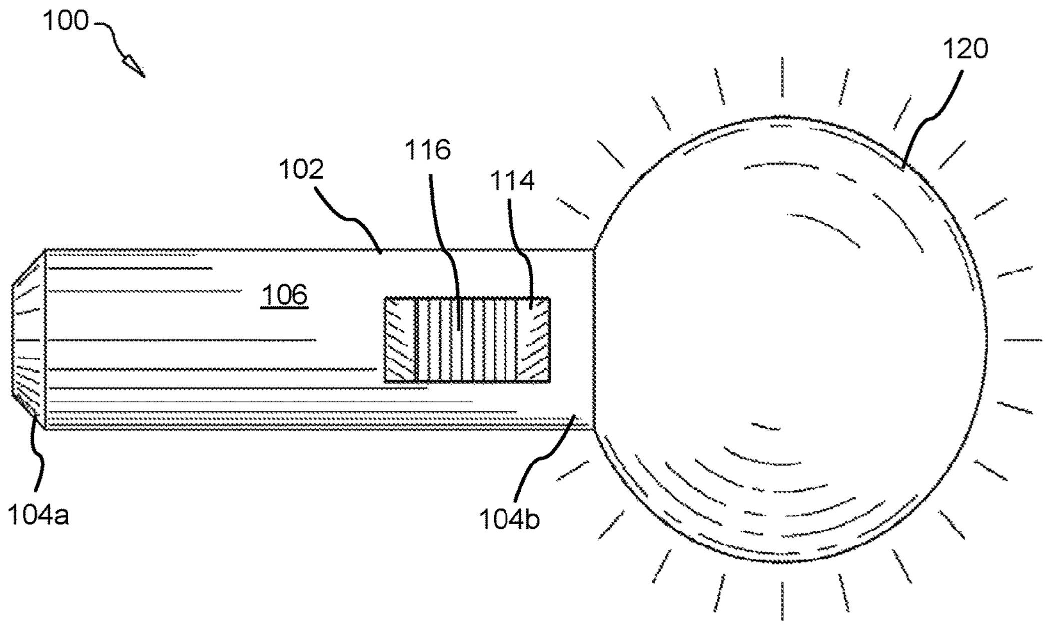
FIG. 1 is a right side view illustrating one embodiment of an electric illuminating device with orb-shaped lens, in accordance with the present invention.

FIG. 1 depicts an electric illuminating device 100 with orb-shaped lens 120 for enhancing forward and lateral visibility around a user. The electric illuminating device 100 with orb-shaped lens, hereafter "device 100" is configured to provide a hand-held lighting device 100 that emits light rays 200 through an orb-shaped lens 120. The generally global shape and uniform thickness of the orb-shaped lens 120 is configured to cast a 270° arc of uniform light around a user holding the device 100. The orb-shaped lens 120 is also effective for softening the light and minimizing shadows around the user, which further enhance visibility.

In some embodiments, the device 100 comprise a portable hand-held electric light, which may include a flashlight, a torch, a lantern, and a lamp that are carried by the hand for mobile illumination. It is known in the art that such hand-held lighting assemblies are carried by hand in dark areas where lighting is minimal, or nonexistent. The present invention enhances lighting both in front of, and approximately 270° to the sides of the user holding the device 100.

Figure 2:
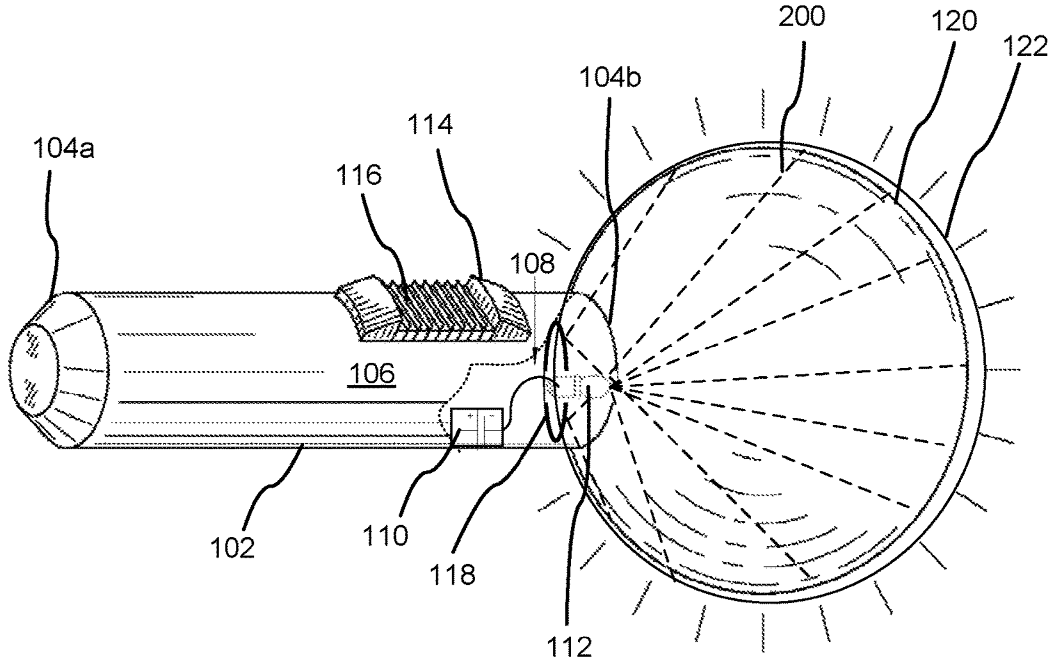
FIG. 2 is a perspective sectioned view further illustrating a light source inside the electric illuminating device of FIG. 1, in accordance with the present invention.

Turning now to FIG. 2, the device 100 comprises a case 102 that is defined by a proximal end **104*a* and a distal end 104*b*. The case 102 also includes sidewalls 106 that form an interior cavity 108. The case 102 may be elongated and cylindrical in shape. The cylindrical shape of the case 102 allows the device 100 to be easily gripped and manipulated from the proximal end 104*a*. Though in other embodiments, the device 100** may be stationary and too large and heavy to be held by the hand.

In some embodiments, the inner cavity of the case 102 may include a power supply 110. The power supply 110 may include, without limitation, a D/C battery, a rechargeable battery, a solar panel, and an external power supply 110. The device 100 is generally powered through such electrical means.

In some embodiments, a switch 114 is used to regulate the power and intensity of illumination. The switch 114 is operatively connected to the power supply 110. In some embodiments, the switch 114 comprises a single-pole switch 114 to connect and disconnect the power supply 110 to the light source 112. The switch 114 may be operational on the sidewall 106 of the case 102, disposed towards the proximal end **104*a* to facilitate operation thereof; especially when the case 102 is being held by the hand. In one non-limiting embodiment, the switch 114 comprises a textured surface 116 that enables the thumb to grip and manipulate the switch 114** in a more efficient manner.

In some embodiments, at least one light source 112 is disposed in the interior cavity 108 of the case 102. The light source 112 is configured to emit light rays 200 in a direction generally away from the proximal end 104*a* of the case 102, and towards the distal end 104*b*. The light source 112 is operatively connected to the switch 114 and the power supply 110, such that the switch 114 regulates power of the light source 112, and intensity of light rays 200 being emitted therefrom. The power supply 110 provides power for operation of the light source 112. In some embodiments, the light source 112 may include, without limitation, a lamp, an incandescent light bulb or light emitting diode (LED). In one alternative embodiment, more than one light sources may be used, so as to create a unique lighting pattern, provide backup lighting, or cast a more uniform illumination.

As illustrated in FIG. 2, a reflector 118 is disposed in the interior cavity 108 of the case 102, adjacent to the light source 112. The reflector 118 is more proximal to the distal end 104*b* of the case 102 than is the light source 112. This allows the reflector 118 to receive light rays 200 and direct them away from the proximal end 104*a* of the case 102, towards the distal end 104*b*. In some embodiments, the reflector 118 may include a disc-shaped panel of metal that is flat, or may have a slight curvature. The reflector 118 may be coated with a reflective coating to further enhance reflection of light rays 200.

Looking again at FIG. 1, an orb-shaped lens 120 fixedly attaches to the distal end 104*b* of the case 102, forward of the light source 112. The orb-shaped lens 120 receives light rays 200 directly from both the light source 112, and light rays 200 reflected by the reflector 118. The orb-shaped lens 120 is defined by a generally globe shape, and has a uniform thickness. These physical characteristics are configured to disperse the light rays 200 through a substantially 270° arc of uniform light. This allows for illuminating two or more areas simultaneously. The 270° arc of uniform light is efficacious for illuminating a substantial area around the user, such that when the electric illuminating device 100 is held by the hand, an approximate 270° area around the feet of the user is illuminated.

These unique configuration of the orb-shaped lens 120 is also efficacious for diffusing the light rays 200. Those skilled in the art will recognize that diffusing light is effective for softening the illumination from the light source 112. This softer illumination reduces glare, which also enhances visibility. Further, the orb-shaped lens 120 is efficacious in eliminating shadows around the user. Those skilled in the art will recognize that shadows are dark areas that block light. It is also known that shadows are inherent in flat or curvilinear lenses. By casting the light in the 270° arc, the shadows are minimized; and therefore visibility is enhanced. Further, the orb-shape of the lens 120 enhances the aesthetics and ornamental effect of the device 100.

In one alternative embodiment, a transparent cover 122 overlays the orb-shaped lens 120. In yet other embodiments, a small gap may form between the surfaces of the orb-shaped lens 120 and the transparent cover 122. The transparent case 102 follows the generally orb-shape of the lens. In one non-limiting embodiment, the transparent cover 122 has an orb shape, with a circumference slightly larger than the orb-shaped lens 120. The transparent cover 122 works to help protect the light source 112, the reflector 118, the power supply 110, and the switch 114 from external forces and natural elements.

Figure 3:
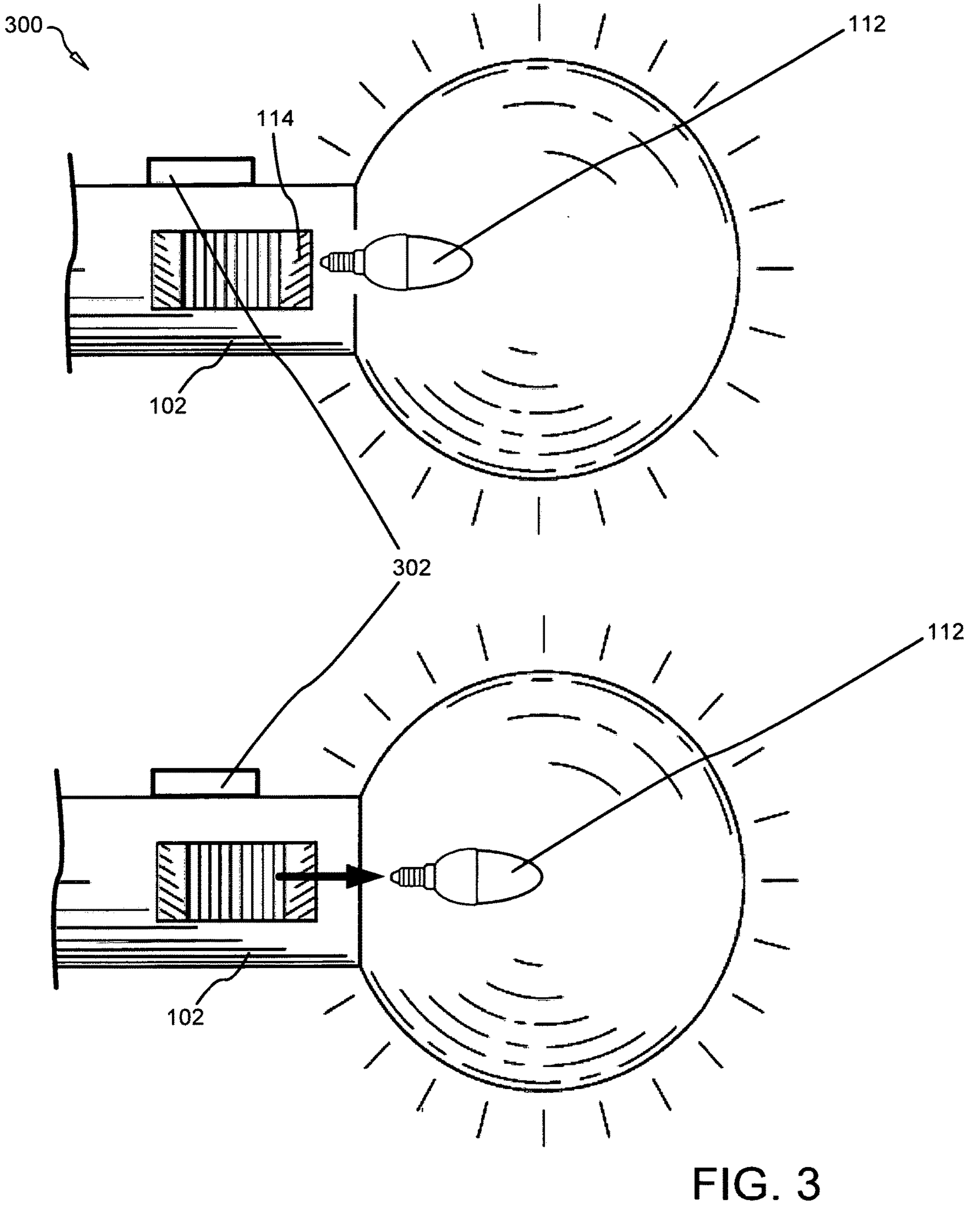
FIG. 3 depicts two sectioned perspective views further illustrating a light source inside the electric illuminating device of FIG. 1, in accordance with the present invention.

FIG. 3 depicts two sectioned perspective views further illustrating a light source inside the electric illuminating device of FIG. 1, in accordance with the present invention.

The case 102 in the shown embodiment may comprise a two switches 114, 302. While in some embodiments, the switch 114 may be used to turn the light 300 on and off, in other embodiments, the switch 114 may be depressed to turn the flashlight 300 on, then continually depressed thereafter to move the lightbulb 112 forward or backward. As the lightbulb 112 moves forward, more light is emitted laterally from the bulb, increasing illumination of the lateral areas of the flashlight 300. As the lightbulb 112 is drawn inward, or retracted (in some embodiments into a reflective parabolic dish), emitted light is directed forward. In this manner, the flashlight 300 vis-à-vis the switch 114 or switch 302 is adapted to change the position of the lightbulb 112 and emit greater light laterally or forwardly in accordance with the configuration set by a user.

For the purposes of this invention, the term lightbulb 112 may include any light-emitting source, including an incandescent light bulb or light-emitting diode (LED), or LED array.

The device 300 may include either a switch 114, a switch 302, or both. In some embodiments, the switch 302 is slideably or depressably operated to control lightbulb 112 position, while in other embodiments, the switch 114 is operable to control both on/off function of the apparatus 300 and lightbulb 112 position.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electric illuminating apparatus with orb-shaped lens, the device consisting of:

a generally elongated cylindrical case defined by a proximal end, a distal end, and a sidewall forming an interior cavity, the distal end of the case forming an opening;

a power supply, the power supply comprising at least one of the following: a D/C battery, a rechargeable battery, a solar panel, and an external power supply;

a switch operatively connected to the power supply, the switch being defined by a textured surface;

at least one light source disposed at the distal end of the case, the light source being operatively connected to the power supply and the switch, the light source emitting light rays to affect illumination, the at least one light source comprising an incandescent light bulb or a light emitting diode;

whereby the power supply powers illumination by the light source;

whereby the switch selectively regulates illumination by the light source and the switch is slidable to change position of the light source relative to the orb-shaped lens;

a reflector disposed in the interior cavity of the case, and adjacent to the light source, the reflector being sized and dimensioned to at least partially reflect the light rays from the light source towards the distal end of the case, the reflector comprising a disc-shaped panel of metal;

an orb-shaped lens disposed at the distal end of the case, the orb-shaped lens being defined by a generally globe shape and a uniform thickness, the orb-shaped lens enabling passage of the light rays emitted by the light source and reflected by the reflector;

whereby the orb-shaped lens disperses the light rays in a 270° arc of uniform light;

whereby the orb-shaped lens softens illumination from the light source; and whereby the orb-shaped lens reduces shadows created by the illumination.

2. The apparatus of claim 1, wherein the at least one light source comprises multiple light sources.

3. The apparatus of claim 1, wherein the device comprises a flashlight.

4. The apparatus of claim 1, wherein the light source comprises an LED.

* * * * *